(12) United States Patent
Storch et al.

(10) Patent No.: US 12,458,445 B2
(45) Date of Patent: Nov. 4, 2025

(54) METHOD OF SAMPLING RELEVANT SURFACE POINTS OF A SUBJECT

(71) Applicant: Brainlab AG, Munich (DE)

(72) Inventors: Ferdinand Storch, Munich (DE); Jannik Christ, Munich (DE)

(73) Assignee: Brainlab SE, Munich (DE)

( * ) Notice: Subject to any disclaimer, the term of this patent is extended or adjusted under 35 U.S.C. 154(b) by 1022 days.

(21) Appl. No.: 17/602,603

(22) PCT Filed: Apr. 9, 2020

(86) PCT No.: PCT/EP2020/060221
§ 371 (c)(1),
(2) Date: Oct. 8, 2021

(87) PCT Pub. No.: WO2020/208171
PCT Pub. Date: Oct. 15, 2020

(65) Prior Publication Data
US 2022/0202504 A1 Jun. 30, 2022

(30) Foreign Application Priority Data

Apr. 10, 2019 (WO) .................. PCT/EP2019/059156

(51) Int. Cl.
*A61B 34/20* (2016.01)
*A61B 5/00* (2006.01)
*A61B 90/00* (2016.01)

(52) U.S. Cl.
CPC ............ *A61B 34/20* (2016.02); *A61B 5/0064* (2013.01); *A61B 90/39* (2016.02);
(Continued)

(58) Field of Classification Search
CPC ....... A61B 34/20; A61B 90/39; A61B 5/0064; A61B 2034/2051; A61B 2034/2055; A61B 2090/3937
See application file for complete search history.

(56) References Cited

U.S. PATENT DOCUMENTS

| 10,276,289 B1 | 4/2019 | Kirby et al. |
| 2011/0054300 A1* | 3/2011 | Yamamoto ............. A61B 90/36 600/411 |

(Continued)

FOREIGN PATENT DOCUMENTS

| CN | 107918925 A1 | 4/2018 |
| EP | 1563799 A1 | 8/2005 |

(Continued)

OTHER PUBLICATIONS

Brainlab Neurosurgery Product Catalog, Jan. 2016, 11 pages.
(Continued)

*Primary Examiner* — Sean A Frith
(74) *Attorney, Agent, or Firm* — Tucker Ellis LLP (57) ABSTRACT

A method and a registration device for sampling relevant surface points of a subject for a medical navigation system is presented. From a plurality of surface points of the subject, relevant surface points are accepted and non-relevant surface points are discarded. The method allows the surface geometry acquisition of a subject to be improved. For this purpose, additional information of the surface points is acquired and assigned to the respective surface point for validating each surface point.

23 Claims, 2 Drawing Sheets

(52) U.S. Cl.
CPC .......... *A61B 2034/2051* (2016.02); *A61B 2034/2055* (2016.02); *A61B 2090/3937* (2016.02)

(56) References Cited

U.S. PATENT DOCUMENTS

| | | | |
|---|---|---|---|
| 2015/0150645 A1 | 6/2015 | Woerlein et al. | |
| 2017/0193674 A1 | 7/2017 | Haimerl | |
| 2017/0281283 A1 | 10/2017 | Siegler et al. | |
| 2018/0153626 A1 | 6/2018 | Yang et al. | |
| 2018/0200002 A1 | 7/2018 | Kostrzewski et al. | |
| 2019/0005661 A1 | 1/2019 | Steinle et al. | |
| 2019/0104980 A1* | 4/2019 | Farooq | A61B 5/0037 |
| 2019/0142524 A1 | 5/2019 | Hladio et al. | |
| 2022/0079675 A1* | 3/2022 | Lang | G02B 30/52 |

FOREIGN PATENT DOCUMENTS

| | | | |
|---|---|---|---|
| EP | 1857070 A1 | 11/2007 | |
| JP | 2018061835 A1 | 4/2018 | |
| JP | 2018126498 A1 | 8/2018 | |
| WO | 2013/152790 A1 | 10/2013 | |
| WO | 2015/074158 A1 | 5/2015 | |
| WO | 2016207163 A1 | 12/2016 | |
| WO | 2017/0185170 A1 | 11/2017 | |
| WO | WO-2017185170 A1 * | 11/2017 | A61B 34/20 |
| WO | 2017/214735 A1 | 12/2017 | |
| WO | 2017/219149 A1 | 12/2017 | |
| WO | 2018/006168 A1 | 1/2018 | |
| WO | 2018/232514 A1 | 12/2018 | |

OTHER PUBLICATIONS

Fiagon ENT Navigation Brochure, Nov. 7, 2017, 8 pages.
Video from YouTube from Jan. 23, 2017 entitled "7D Surgical - Flash Registration™", from "7D Surgical". Retrieved from Internet: < https://www.youtube.com/watch?v=avkAH537wSk>, 4 pages.
International Search Report, corresponding to application serial No. PCT/EP2020/060221, filed Apr. 4, 2020, 5 pages.
Video from YouTube from Sep. 30, 2015 entitled "Surface Matching with Z-touch and Softouch", from "Brainlab". Retrieved from Internet: https://www.youtube.com/watch?v=C9ngfY97Bkg>, 6 pages.
Office Action received in corresponding CN case, application No. 202080027746.5, issued Dec. 18, 2023, 2023, 14 pages.

* cited by examiner

METHOD OF SAMPLING RELEVANT SURFACE POINTS OF A SUBJECT

RELATED APPLICATION DATA

This application is a national phase application of International Application No. PCT/EP2020/060221 filed Apr. 9, 2020, which claims priority to International Application No. PCT/EP2019/059156, filed on Apr. 10, 2019, the contents of both of which are incorporated herein by reference.

FIELD OF THE INVENTION

The present invention relates to a method of sampling relevant surface points of a subject for a medical navigation system, a registration device, a surgical navigation system for computer assisted surgery as well as a computer program.

TECHNICAL BACKGROUND

Surface-based image registration is an established method to relate medical image data to an anatomic area of a patient. Surface geometry acquisition methods can be divided into contact-free and contact-based methods. Contact-based methods typically are prone to measurement errors since points can be acquired above or below the actual surface. Contact-free methods on the other hand typically can't be used to acquire points on covered (e. g. by hair) regions.

The present invention can be used for the IGS (Image Guided Surgery) workflow. Potential applications include spinal-surgery, cranial-surgery, ent-surgery, cmf-surgery and laparoscopic-surgery.

Aspects of the present invention, examples and exemplary steps and their embodiments are disclosed in the following. Different exemplary features of the invention can be combined in accordance with the invention wherever technically expedient and feasible.

EXEMPLARY SHORT DESCRIPTION OF THE INVENTION

In the light of the prior art descripted hereinbefore, it may be seen as the object of the present invention to provide an improved method for sampling relevant surface points of a subject for a medical navigation system by including an analysis of the tissue type of the subject.

In the following, a short description of the specific features of the present invention is given which shall not be understood to limit the invention only to the features or a combination of the features described in this section.

A method of sampling relevant surface points of a subject for a medical navigation system is presented.

In particular, from a plurality of surface points of the subject, relevant surface points are accepted and non-relevant surface points are discarded. One technical effect of the invention is that the surface geometry acquisition of a subject can be improved.

For this purpose, additional information of the surface points is acquired and assigned to the respective surface point for validating each surface point.

GENERAL DESCRIPTION OF THE INVENTION

In this section, a description of the general features of the present invention is given for example by referring to possible embodiments of the invention.

This is achieved by the subject-matter of the independent claims, wherein further embodiments are incorporated in the dependent claims and the following description.

The described embodiments similarly pertain to the method of sampling relevant surface points of a subject for a medical navigation system, a surgical navigation system for computer assisted surgery as well as a computer program. Synergetic effects may arise from different combinations of the embodiments although they might not be described in detail hereinafter. Furthermore, it shall be noted that all embodiments of the present invention concerning a method, might be carried out with the order of the steps as explicitly described herein. Nevertheless, this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to the present disclosure, a method of sampling relevant surface points of a subject for a medical navigation system is provided. The method comprises the step of determining a surface registration type for an intended procedure on the subject dependent on the intended procedure, wherein the surface registration type comprises at least one relevant tissue type of at least part of the subject. Further, determining a position of at least one surface point of the subject using a registration device. The method further comprises identifying a tissue type of the subject at the determined at least one surface point and validating the at least one surface point dependent on the identified tissue type and the determined surface registration type of the intended procedure, thereby determining a position of at least one relevant surface point and/or at least one non-relevant surface point, wherein the at least one relevant surface point is accepted and the at least one non-relevant surface point is discarded.

In a preferred embodiment, the method is executed for each surface point. Alternatively, a plurality of surface points is determined, therefore a tissue type of the subject for each surface point is identified and the validation step then relates to filtering relevant surface points from the plurality of determined surface points. In this case, a step of linking the determined surface points to the identified tissue type of the subject at the corresponding surface point is needed.

In a preferred embodiment, a plurality of frames, or in other words images, are taken during the sampling process, wherein for every frame at least one surface point of the subject is determined and a tissue type of the determined surface point is identified. In case of using a 3D-scanner or a structured light scanner, more than one surface point of the subject can be determined for every frame.

In a preferred embodiment, the tissue type comprises skin, bone, different tissues, in particular biological tissue, like blood vessels, heart tissue, liver tissue and/or kidney tissue, and/or non-biological tissue, like drape, in particular operation drape, silicone incision drape, and/or a table cushion. The term "tissue type", as used herein, can generally be related to as surface type.

In a preferred embodiment, the surface registration type comprises facial registration, in particular for neurosurgery, intranasal registration in particular for ENT-surgery, liver registration, in particular for laparoscopic surgery and/or open surgery, and/or bone surface registration, in particular for spinal surgery and/or orthopaedic surgery.

Thus, for example, for facial registration and/or ENT-surgery, a relevant tissue type comprises skin. In a further example, for bone surface registration, a relevant tissue type comprises bone. According to a further example, for liver registration, a relevant tissue type comprises liver tissue. For example, for intranasal registration, a relevant tissue type comprises mucosa.

The term "subject", as used herein, comprises a human body, in particular a patient.

The term "surface point", as used herein, can also be referred to as surface coordinates.

The term "relevant surface point", as used herein, relates to surface points that are validated as relevant for the determined surface registration type. For example, a surface point with the tissue type "bone" is a relevant surface point for spinal surgery. In a further example, a surface point with the tissue type "drape" is typically a non-relevant surface point.

The term "intended procedure" relates to a procedure and/or intervention like for example a surgery that is intended to be performed on a certain subject like for example a patient.

Preferably, the method, as describes herein, relates to a computer-implemented medical method.

Thus, only relevant surface data is acquired and non-relevant surface data does not distort the relevant data set.

Thus, the surface geometry acquisition of a subject can be improved.

Computer Implemented Method

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, Ill-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a program which, when running on a computer, causes the computer to perform one or more or all of the method steps described herein and/or to a program storage medium on which the program is stored (in particular in a non-transitory form) and/or to a computer comprising said program storage medium and/or to a (physical, for example electrical, for example technically generated) signal wave, for example a digital signal wave, carrying information which represents the program, for example the aforementioned program, which for example comprises code means which are adapted to perform any or all of the method steps described herein.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

Acquiring Data

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

Registering

The n-dimensional image of a body is registered when the spatial location of each point of an actual object within a space, for example a body part in an operating theatre, is assigned an image data point of an image (CT, MR, etc.) stored in a navigation system.

Image Registration

Image registration is the process of transforming different sets of data into one co-ordinate system. The data can be multiple photographs and/or data from different sensors, different times or different viewpoints. It is used in computer vision, medical imaging and in compiling and analysing images and data from satellites. Registration is necessary in order to be able to compare or integrate the data obtained from these different measurements.

Marker

It is the function of a marker to be detected by a marker detection device (for example, a camera or an ultrasound receiver or analytical devices such as CT or MRI devices) in such a way that its spatial position (i.e. its spatial location and/or alignment) can be ascertained. The detection device is for example part of a navigation system. The markers can be active markers. An active marker can for example emit electromagnetic radiation and/or waves which can be in the infrared, visible and/or ultraviolet spectral range. A marker can also however be passive, i.e. can for example reflect electromagnetic radiation in the infrared, visible and/or ultraviolet spectral range or can block x-ray radiation. To this end, the marker can be provided with a surface which has corresponding reflective properties or can be made of metal in order to block the x-ray radiation. It is also possible for a marker to reflect and/or emit electromagnetic radiation and/or waves in the radio frequency range or at ultrasound wavelengths. A marker preferably has a spherical and/or spheroid shape and can therefore be referred to as a marker sphere; markers can however also exhibit a cornered, for example cubic, shape.

Marker Device

A marker device can for example be a reference star or a pointer or a single marker or a plurality of (individual) markers which are then preferably in a predetermined spatial relationship. A marker device comprises one, two, three or more markers, wherein two or more such markers are in a predetermined spatial relationship. This predetermined spatial relationship is for example known to a navigation system and is for example stored in a computer of the navigation system.

In another embodiment, a marker device comprises an optical pattern, for example on a two-dimensional surface. The optical pattern might comprise a plurality of geometric shapes like circles, rectangles and/or triangles. The optical pattern can be identified in an image captured by a camera, and the position of the marker device relative to the camera can be determined from the size of the pattern in the image, the orientation of the pattern in the image and the distortion of the pattern in the image. This allows determining the relative position in up to three rotational dimensions and up to three translational dimensions from a single two-dimensional image.

The position of a marker device can be ascertained, for example by a medical navigation system. If the marker device is attached to an object, such as a bone or a medical instrument, the position of the object can be determined from the position of the marker device and the relative position between the marker device and the object. Determining this relative position is also referred to as registering the marker device and the object. The marker device or the object can be tracked, which means that the position of the marker device or the object is ascertained twice or more over time.

Marker Holder

A marker holder is understood to mean an attaching device for an individual marker which serves to attach the marker to an instrument, a part of the body and/or a holding element of a reference star, wherein it can be attached such that it is stationary and advantageously such that it can be detached. A marker holder can for example be rod-shaped and/or cylindrical. A fastening device (such as for instance a latching mechanism) for the marker device can be provided at the end of the marker holder facing the marker and assists in placing the marker device on the marker holder in a force fit and/or positive fit.

Pointer

A pointer is a rod which comprises one or more—advantageously, two—markers fastened to it and which can be used to measure off individual co-ordinates, for example spatial co-ordinates (i.e. three-dimensional co-ordinates), on a part of the body, wherein a user guides the pointer (for example, a part of the pointer which has a defined and advantageously fixed position with respect to the at least one marker attached to the pointer) to the position corresponding to the co-ordinates, such that the position of the pointer can be determined by using a surgical navigation system to detect the marker on the pointer. The relative location between the markers of the pointer and the part of the pointer used to measure off co-ordinates (for example, the tip of the pointer) is for example known. The surgical navigation system then enables the location (of the three-dimensional co-ordinates) to be assigned to a predetermined body structure, wherein the assignment can be made automatically or by user procedure.

Reference Star

A "reference star" refers to a device with a number of markers, advantageously three markers, attached to it, wherein the markers are (for example detachably) attached to the reference star such that they are stationary, thus providing a known (and advantageously fixed) position of the markers relative to each other. The position of the markers relative to each other can be individually different for each reference star used within the framework of a surgical navigation method, in order to enable a surgical navigation system to identify the corresponding reference star on the basis of the position of its markers relative to each other. It is therefore also then possible for the objects (for example, instruments and/or parts of a body) to which the reference star is attached to be identified and/or differentiated accordingly. In a surgical navigation method, the reference star serves to attach a plurality of markers to an object (for example, a bone or a medical instrument) in order to be able to detect the position of the object (i.e. its spatial location and/or alignment). Such a reference star for example features a way of being attached to the object (for example, a clamp and/or a thread) and/or a holding element which ensures a distance between the markers and the object (for example in order to assist the visibility of the markers to a marker detection device) and/or marker holders which are mechanically connected to the holding element and which the markers can be attached to.

Navigation System

The present invention is also directed to a navigation system for computer-assisted surgery. This navigation system preferably comprises the aforementioned computer for processing the data provided in accordance with the computer implemented method as described in any one of the embodiments described herein. The navigation system preferably comprises a detection device for detecting the position of detection points which represent the main points and auxiliary points, in order to generate detection signals and to supply the generated detection signals to the computer, such that the computer can determine the absolute main point data and absolute auxiliary point data on the basis of the detection signals received. A detection point is for example a point on the surface of the anatomical structure which is detected, for example by a pointer. In this way, the absolute point data can be provided to the computer. The navigation system also preferably comprises a user interface for receiving the calculation results from the computer (for example, the position of the main plane, the position of the auxiliary plane and/or the position of the standard plane). The user interface provides the received data to the user as information. Examples of a user interface include a display device such as a monitor, or a loudspeaker. The user interface can use any kind of indication signal (for example a visual signal, an audio signal and/or a vibration signal). One example of a display device is an augmented reality device (also referred to as augmented reality glasses) which can be used as so-called "goggles" for navigating. A specific example of such augmented reality glasses is Google Glass (a trademark of Google, Inc.). An augmented reality device can be used both to input information into the computer of the navigation system by user interaction and to display information outputted by the computer.

The invention also relates to a navigation system for computer-assisted surgery, comprising:
 a computer for processing the absolute point data and the relative point data;
 a detection device for detecting the position of the main and auxiliary points in order to generate the absolute point data and to supply the absolute point data to the computer; a data interface for receiving the relative point data and for supplying the relative point data to the computer; and
 a user interface for receiving data from the computer in order to provide information to the user, wherein the received data are generated by the computer on the basis of the results of the processing performed by the computer.

Surgical Navigation System

A navigation system, such as a surgical navigation system, is understood to mean a system which can comprise: at least one marker device; a transmitter which emits electromagnetic waves and/or radiation and/or ultrasound waves; a receiver which receives electromagnetic waves and/or radiation and/or ultrasound waves; and an electronic data processing device which is connected to the receiver and/or the transmitter, wherein the data processing device (for example, a computer) for example comprises a processor (CPU) and a working memory and advantageously an indicating device for issuing an indication signal (for example, a visual indicating device such as a monitor and/or an audio indicating device such as a loudspeaker and/or a tactile indicating device such as a vibrator) and a permanent data memory, wherein the data processing device processes navigation data forwarded to it by the receiver and can advantageously output guidance information to a user via the indicating device. The navigation data can be stored in the permanent data memory and for example compared with data stored in said memory beforehand.

Landmarks

A landmark is a defined element of an anatomical body part which is always identical or recurs with a high degree of similarity in the same anatomical body part of multiple patients. Typical landmarks are for example the epicondyles of a femoral bone or the tips of the transverse processes and/or dorsal process of a vertebra. The points (main points or auxiliary points) can represent such landmarks. A landmark which lies on (for example on the surface of) a characteristic anatomical structure of the body part can also represent said structure. The landmark can represent the anatomical structure as a whole or only a point or part of it. A landmark can also for example lie on the anatomical structure, which is for example a prominent structure. An example of such an anatomical structure is the posterior aspect of the iliac crest. Another example of a landmark is one defined by the rim of the acetabulum, for instance by the centre of said rim. In another example, a landmark represents the bottom or deepest point of an acetabulum, which is derived from a multitude of detection points. Thus, one landmark can for example represent a multitude of detection points. As mentioned above, a landmark can represent an anatomical characteristic which is defined on the basis of a characteristic structure of the body part. Additionally, a landmark can also represent an anatomical characteristic defined by a relative movement of two body parts, such as the rotational centre of the femur when moved relative to the acetabulum.

Referencing

Determining the position is referred to as referencing if it implies informing a navigation system of said position in a reference system of the navigation system.

For example, the invention does not involve or in particular comprise or encompass an invasive step which would represent a substantial physical interference with the body requiring professional medical expertise to be carried out and entailing a substantial health risk even when carried out with the required professional care and expertise. For example, the invention does not comprise a step of positioning a medical implant in order to fasten it to an anatomical structure or a step of fastening the medical implant to the anatomical structure or a step of preparing the anatomical structure for having the medical implant fastened to it. More particularly, the invention does not involve or in particular comprise or encompass any surgical or therapeutic activity.

In the following preferred embodiments will be described in more detail.

According to another exemplary embodiment of the present invention, the step of determining the position of the at least one surface point comprises determining a spatial position and/or orientation of the registration device relative to the subject and determining the distance between the registration device and the surface point of the subject.

In a preferred embodiment, the spatial position and/or orientation of the registration device is determined with 5 or 6 degrees of freedom. Preferably, a tracking device determines the spatial position and/or orientation of the registration device relative to the subject.

Preferably, a tracking system is configured for determining the spatial position and/or orientation of the registration device and the subject, thereby determining a relation of spatial position and/or orientation of the registration device and the subject. In other words, a reference point is determined, to which the spatial position and/or orientation of the registration device and the subject are determined. Consequently, the spatial position and/or orientation of the registration device in relation to the subject can be determined. The tracking system preferably comprises all component necessary for tracking the registration device and the subject.

Thus, the surface geometry acquisition of a subject can be improved.

According to another exemplary embodiment of the present invention, the method comprises the step of identifying the tissue type of the subject comprises determining property measurements of the subject and comparing the determined property measurement of the subject with predetermined property values linked to different tissue types.

The "term property measurements" relates to different properties of the subject that can be measured.

Thus, the surface geometry acquisition of a subject can be improved.

According to another exemplary embodiment of the present invention, the property measurements comprise attenuation of radiation, color, spectral absorption, Raman spectroscopy, and/or fluorescence.

Preferably, the color relates to the original color of an object, like the skin color or the hair color. Additionally, for example the colors green or blue are uncommon for a surface on a human body, but are common for drapes used in medical technology. Thus, the color of the subject at a specific surface point can lead to the tissue type of the subject.

The property measurements are preferably measured by a tissue type identification unit, further preferably comprising a property measurement unit, configured for measuring property measurements of the subject. The property measurement unit preferably comprises a camera, in particular for measuring a colour, a radiation detector, in particular for measuring an attenuation of radiation, a spectrometer, in particular for measuring a spectral absorption, a Raman spectrometer, in particular for measuring a Raman spectroscopy, and/or a photometer, in particular for measuring a fluorescence.

Thus, the surface geometry acquisition of a subject can be improved.

According to another exemplary embodiment of the present invention, the method comprises the step of determining the at least one surface point of the subject and identifying the tissue type of the subject at the determined at least one surface point is executed simultaneously for each surface point.

Thus, a step of linking the tissue type to the corresponding surface point is unnecessary.

Thus, the surface geometry acquisition of a subject can be simplified and thus be improved.

According to another exemplary embodiment of the present invention, the method comprises the step of determining the position of the at least one surface point of the subject by using a contact-free tracking device.

Thus, the surface geometry acquisition of a subject can be improved.

According to another exemplary embodiment of the present invention, the method comprises the step of determining the at least one surface point of the subject by using an optical tracking device.

Thus, the surface geometry acquisition of a subject can be improved.

According to another exemplary embodiment of the present invention, the method comprises the step of determining the spatial position and/or an orientation of the registration device relative to the subject with at least 5 degree of freedom, by using at least one optical marker of the optical tracking device.

Preferably, the tracking device is a component of the registration device that is used for tracking the registration device.

In a preferred embodiment, the method comprises the steps of providing a light beam by an optical light source of an optical tracking system, reflecting the light beam at the at least one light reflecting optical marker, disposed at least at the registration device, and determining the spatial position and/or an orientation of the registration device relative to the subject with at least 5 degree of freedom based on the reflected light beam.

Preferably, the light beam is an infrared light beam.

Preferably, at least one optical marker is disposed each at the registration device and the subject.

Preferably, the optical light source defines the reference point, to which the spatial position and/or orientation of the registration device and the subject are determined.

Thus, the surface geometry acquisition of a subject can be improved.

According to another exemplary embodiment of the present invention, the method comprises the step of determining the position of the at least one surface point of the subject by using an electromagnetic tracking device.

The tracking device for example is an electromagnetic tracking device comprising at least one electromagnetic sensor, in particular a coil and/or a chip, for tracking. Preferably, the electromagnetic sensor is disposed within the tracking device with an angle to other sensors of the tracking device. Electromagnetic tracking is in contrast to optical tracking, not dependent on a visual connection to the subject. Thus, electromagnetic tracking is especially preferred with a subject in prone position and/or tip tracking of flexible instruments. This also applies, if the subject is covered, in particular by a draft or when the subject is stained with blood.

Thus, the surface geometry acquisition of a subject can be improved.

According to another exemplary embodiment of the present invention, the method comprises the step of determining the spatial position and/or an orientation of the registration device relative to the subject with at least 5 degree of freedom, by using at least one electromagnetic sensor, in particular a coil or a chip, of the electromagnetic device.

In a preferred embodiment, the method comprises the steps of providing a time-varying electromagnetic field by an electromagnetic field generator of an electromagnetic tracking system and determining the spatial position and/or an orientation of the registration device relative to the subject with at least 5 degree of freedom based on the electromagnetic field. Preferably, the electromagnetic sensor is configured for detecting a change of the electromagnetic field over time. For example, if the electromagnetic sensor comprises at least one coil, the time-varying electromagnetic field induces a time-varying current into the coil.

Preferably, at least one electromagnetic sensor is disposed each at the registration device and the subject.

Preferably, the electromagnetic field generator defines the reference point, to which the spatial position and/or orientation of the registration device and the subject are determined.

Thus, the surface geometry acquisition of a subject can be improved.

According to another exemplary embodiment of the present invention, the method comprises the step of determining the position of the at least one surface point of the subject by using a magnetic tracking device.

Thus, the surface geometry acquisition of a subject can be improved.

According to another exemplary embodiment of the present invention, the method comprises the step of determining the spatial position and/or an orientation of the registration device relative to the subject with at least 5 degree of freedom by using at least one magnetic sensor of the magnetic tracking device.

In a preferred embodiment, the method comprises the steps of providing a time-varying magnetic field by a magnetic field generator of a magnetic tracking system and determining the spatial position and/or an orientation of the registration device relative to the subject with at least 5 degree of freedom based on the magnetic field. Preferably, the magnetic sensor is configured for detecting a change of the magnetic field over time.

Preferably, the magnetic field generator comprises a permanent magnet and is configured to rotate the permanent magnet simultaneously about a first axis of rotation and a second axis of rotation to generate the time-varying magnetic field. The second axis of rotation intersects the first axis of rotation at an intersection that is offset from a center of mass of the permanent magnet.

Preferably, the magnetic sensor comprises a giant magnetoresistive sensor, an anisotropic magnetoresistive sensor or a Hall-effect sensor.

Preferably, at least one magnetic sensor is disposed each at the registration device and the subject.

Preferably, the magnetic field generator defines the reference point, to which the spatial position and/or orientation of the registration device and the subject are determined.

Thus, the surface geometry acquisition of a subject can be improved.

According to another exemplary embodiment of the present invention, the method comprises the step of determining the position of the at least one surface point of the subject by using a video-based tracking device.

Thus, the surface geometry acquisition of a subject can be improved.

According to another exemplary embodiment of the present invention, the method comprises the step of determining the spatial position and/or an orientation of the registration device relative to the subject with at least 5 degree of freedom by using at least one video marker of the video-based tracking device.

In a preferred embodiment, the method comprises the step of identifying the video marker disposed at least at the registration device by a video camera of a video-based tracking system and determining the spatial position and/or an orientation of the registration device relative to the subject with at least 5 degree of freedom based on the video marker.

Preferably, the video marker is a bar-code or a QR-code.

Preferably, at least one video marker is disposed each at the registration device and the subject.

Preferably, the video camera defines the reference point, to which the spatial position and/or orientation of the registration device and the subject are determined.

Thus, the surface geometry acquisition of a subject can be improved.

According to another exemplary embodiment of the present invention, the method comprises the step of executing a surface matching registration, registering the subject to the medical navigation device, dependent on the accepted relevant surface points.

In a preferred embodiment, the medical navigation device has stored virtual image data of the subject, with which the relevant surface points are matched for the surface matching registration. Additionally, the medical navigation device has stored virtual image data of the registration device, which are in line with the tracked registration device. Thus, if the matching is executed perfectly, the disposition of the registration device to the subject in reality is in accordance with the disposition of the virtual image of the registration device to the virtual image of the subject.

Preferably, the surface matching registration is executed, when a predetermined amount of relevant surface points have been accepted.

Thus, the surface geometry acquisition of a subject can be improved.

According to another exemplary embodiment of the present invention, the method comprises the step of verifying the surface matching registration by comparing a real position of the registration device in view of the subject with a virtual position of a virtual representation of the registration device in view of an image dataset of the subject.

In a preferred embodiment, the step of verification is performed by a medical professional, like a surgeon.

In a preferred embodiment, an easy to check controlling point is used for the verification. For example, the user compares the real position of a tip of the registration device, in particular the tip of a pen shaped contact-based tracking device, in view of the subject with the virtual position of a tip of the virtual representation of the registration device, in particular the tip of the pen shaped contact-based tracking device, in view of the image dataset of the subject.

The image dataset of the subject preferably is a digital model of the subject, further preferably predetermined to the sampling method.

The position of the registration device in real-life relates to the position of the registration device compared to a physical anatomy of the subject, in particular of a patient.

It should be clarified that it is not necessary that a specific surface point of the subject was acquired at a specific location, for example the tip of the registration device.

According to another exemplary embodiment of the present invention, the method comprises the step of determining the position of the at least one surface point of the subject by using a contact-based tracking device.

Preferably, the contact-based tracking device extends from the registration device in a pen form with a tip for contacting the surface of the subject.

In a preferred embodiment, the contact-based position determination is preferably used for determining additional surface points. Thus, surface points can be determined by contact-based position determination, which only can hardly or not all be determined by contact-free position determination. For example, a position of a surface of a head might be relatively easy to be determined by contact-free position determination. However, if parts of the head are covered with hair, contact-free position determination might not be suitable. In this case, contact-based position determination can be used for determining such surface points.

Preferably, the contact-based tracking device itself is able to determine a tissue type of the subject at different surface points when touching the subject. For example, the contact-based tracking device can differ between bone and skin, when touching the subject.

Thus, the surface geometry acquisition of a subject can be improved.

According to another exemplary embodiment of the present invention, the method comprises the step of switching between determining the position of the at least one surface point using the contact-based tracking device and determining the position of the at least one surface point using the contact-free tracking device dependent on the determined distance between the registration device and the surface point of the subject.

In other words, when the registration device comes in contact with the surface point, automatically the contact-based position determination is used. In order to prevent accidental contact-based position determination the contact-based tracking device preferably needs to be within a predetermined distance to the subject for a predetermined time before the contact-based position determination is activated.

Preferably, the contact of the contact-based tracking device with the surface of the subject is detected by a contact sensor. If the contact sensor detects a contact of the contact-based tracking device with the surface of the subject, in particular by detecting skin contact, a determination of at least one surface point of the subject is triggered.

Thus, the surface geometry acquisition of a subject can be improved.

According to another aspect, a registration device for registering a subject for a medical navigation system is provided. The registration device comprises a tissue type identification unit, configured for identifying a tissue type of the subject at at least one surface point, and a control device, configured for determining a position of at least one surface point of the subject, determining a surface registration type for an intended procedure on the subject dependent on the intended procedure, wherein the surface registration type comprises at least one relevant tissue type of at least part of the subject and validating the at least one surface point dependent on the identified tissue type and the determined surface registration type of the intended procedure, thereby determining a position at least one relevant surface point and/or at least one non-relevant surface point, wherein the at least one relevant surface point is accepted and the at least one non-relevant surface point is discarded.

The tissue type identification unit can alternatively be only configured to gather information about the tissue type, while an additional external unit is configured for identifying the tissue type dependent on the information gathered by the tissue type identification unit.

Alternatively, the spatial position and/or orientation of the registration device may be determined by a robotic system. If the proximity sensor is attached to a distal end of a robotic actuator, the spatial position and/or orientation can be derived from the pose of the robotic system.

For example, the registration device is implemented as a handheld device. In a further example, the registration device is implemented as an endoscope.

Preferably, the proximity sensor is a laser triangulation sensor.

Thus, the surface geometry acquisition of a subject can be improved.

According to another exemplary embodiment of the present invention, the registration device comprises a tracking device, configured for determining a spatial position and/or an orientation of the registration device relative to the subject and a proximity sensor, configured for determining a distance between the registration device and at least one surface point of the subject. The control device is configured for determining a position of at least one surface point of the subject dependent on the determined spatial position and/or orientation and/or distance.

Preferably, the spatial position of the proximity sensor to the tracking device is known.

According to another exemplary embodiment of the present invention, the tracking device comprises a contact-free tracking device, configured for determining the position of the at least one surface point of the subject.

Thus, the surface geometry acquisition of a subject can be improved.

According to another exemplary embodiment of the present invention, the tracking device comprises an optical tracking device.

Thus, the surface geometry acquisition of a subject can be improved.

According to another exemplary embodiment of the present invention, the optical tracking device comprises at least one optical marker, configured for being used for determining the spatial position and/or an orientation of the registration device relative to the subject with at least 5 degree of freedom.

Preferably, the optical tracking system comprises an optical light source, configured for providing a light beam, and the at least one light reflecting marker, disposed at least at the patient is configured for reflecting the light beam of the optical light source. Thus, the at least one optical sensor is configured for being used for determining the spatial position and/or an orientation of the registration device relative to the subject based on the reflected light beam.

Thus, the surface geometry acquisition of a subject can be improved.

According to another exemplary embodiment of the present invention, the tracking device comprises an electromagnetic tracking device.

Thus, the surface geometry acquisition of a subject can be improved.

According to another exemplary embodiment of the present invention, the electromagnetic tracking device comprises at least one electromagnetic sensor, configured for being used for determining the spatial position and/or an orientation of the registration device relative to the subject with at least 5 degree of freedom.

Preferably, the electromagnetic tracking system comprises an electromagnetic field generator, configured for generating a time-varying electromagnetic field. Thus, the at least one electromagnetic sensor, preferably an electromagnetic sensor array, is configured for being used for determining the spatial position and/or an orientation of the registration device relative to the subject with at least 5 degree of freedom based on the electromagnetic field.

Thus, the surface geometry acquisition of a subject can be improved.

According to another exemplary embodiment of the present invention, the tracking device comprises a magnetic tracking device.

Thus, the surface geometry acquisition of a subject can be improved.

According to another exemplary embodiment of the present invention, the magnetic tracking device comprises at least one magnetic sensor, preferably a magnetic sensor array, configured for being used for determining the spatial position and/or an orientation of the registration device relative to the subject with at least 5 degree of freedom.

Preferably, the magnetic tracking system comprises a magnetic field generator, configured for generating a time-varying magnetic field. Thus, the at least one magnetic sensor, is configured for being used for determining the spatial position and/or an orientation of the registration device relative to the subject with at least 5 degree of freedom based on the magnetic field.

Preferably, the magnetic field generator comprises a permanent magnet and is configured for rotating the permanent magnet simultaneously about a first axis of rotation and a second axis of rotation. The second axis of rotation intersects the first axis of rotation at an intersection that is offset from a center of mass of the permanent magnet.

Thus, the surface geometry acquisition of a subject can be improved.

According to another exemplary embodiment of the present invention, the tracking device comprises a video-based tracking device.

Thus, the surface geometry acquisition of a subject can be improved.

According to another exemplary embodiment of the present invention, the video-based tracking device comprises at least one video sensor, configured for being used for determining the spatial position and/or an orientation of the registration device relative to the subject with at least 5 degree of freedom.

Preferably, the video-based tracking system comprises at least one scanable marker, disposed at the registration device. Thus, the at least one video sensor is configured for being used for determining the spatial position and/or an orientation of the registration device relative to the subject with at least 5 degree of freedom based on the scanable marker.

Thus, the surface geometry acquisition of a subject can be improved.

According to another exemplary embodiment of the present invention, the electromagnetic tracking device comprises at least one sensor, in particular a coil and/or a chip, configured for determining the spatial position of the registration device relative to the subject with at least 5 degrees of freedom.

Thus, the surface geometry acquisition of a subject can be improved.

According to another exemplary embodiment of the present invention, the tracking device comprises a contact-based tracking device, preferably a pointer, further preferably in addition to the contact-free tracking device, configured for determining the position of the at least one surface point of the subject.

The contact-based tracking device preferably comprises soft-touch.

In a preferred embodiment, the contact-based tracking device is configured for identifying a tissue type of the determined at least one surface point.

Thus, a tracked registration device with means for contact-free tracking and contact-based tracking is provided.

Thus, the surface geometry acquisition of a subject can be improved.

According to another exemplary embodiment of the present invention, the control device is configured for verifying the surface matching registration by comparing a real position of the registration device in view of the subject with a virtual position of a virtual representation of the registration device in view of an image dataset of the subject.

Preferably, the surface matching registration is automatically verified. Preferably, after the matching process has finished, the subject is contacted with the contact-based tracking device for verification. In one embodiment, the verification of the surface matching registration is based on a measured pressure, which applied to the tip of the contact-based tracking device. In a case, where the virtual position of the virtual representation of the registration device in view of the image dataset of the subject meet in a contact point, the pressure applied to the tip of the contact-based tracking device is determined. It is expected that in such a case, the tip of the contact-based tracking device is in contact with the subject, when the surface matching registration is accurate. Consequently, a slight force or pressure should be measurable at the tip of the contact-based tracking device.

Thus, the measured pressure applied to tip of the contact-based tracking device is compared with a predetermined force range, preferably with a lower border of zero. If it is determined that no force is applied to the tip of the contact-based tracking device, or in other words that the contact-based tracking device is not in contact with the subject in real life, the surface matching registration is automatically not verifying. If it is determined that a force, which is greater than the force range is applied to the tip of the contact-based tracking device, or in other words that the contact-based tracking device is not only contacted to the subject but pressed onto the skin of the subject in real life, the surface matching registration is not verified. However, a verification preferably is necessary to proceed. Consequently, if it is determined that the force, which is measured at the tip of the contact-based tracking device, is within the predetermined force range, the surface matching registration is automatically verified.

In other words, the control device is configured for determining a force applied to a tip of the contact-based tracking device; determining that the virtual position of the virtual representation of the registration device in view of the image dataset of the subject meet in a contact point; comparing the force, applied to the tip of the contact-based tracking device with a predetermined force range; and verifying the surface matching registration, if the determined force is within the force range and not verfying the surface matching registration, if the determined force is not within the force range.

In addition, the control device preferably checks a predetermined minimal amount of compared contact points and a predetermined minimal amount of time that the registration device is held in the position to be verified, before verifying or not verifying the surface matching registration.

Alternatively, a medical professional, like a surgeon verifies the surface matching registration. In such a case, further preferably, the registration device only allows a manual verification of the medical professional, if it is determined that the contact-based tracking device is in contact with the subject in real life, for example by determining that a force is applied to the tip of the contact-based tracking device due to holding the contact-based tracking device in contact with the subject in real life.

Thus, the surface geometry acquisition of a subject can be improved.

According to another exemplary embodiment of the present invention, the control device is configured for executing a surface matching registration, registering the subject to the medical navigation device, dependent on the accepted relevant surface points.

Thus, the surface geometry acquisition of a subject can be improved.

According to another exemplary embodiment of the present invention, the control unit is configured for switching between determining the position of the at least one surface point using the contact-based tracking device and determining the position of the at least one surface point using the contact-free tracking device dependent on the determined distance between the registration device and the surface point of the subject.

Thus, the surface geometry acquisition of a subject can be improved.

According to another aspect of the present invention, a surgical navigation system for computer assisted surgery is provided, the system comprising a registration device, as described herein.

According to the present disclosure, a computer program is provided, which, when running on a computer or when loaded onto a computer, causes the computer to perform the method steps of the method, as described herein. Furthermore, a program storage medium is provided, on which the program is stored. Furthermore, a computer is provided, comprising at least one processor and a memory and/or the program storage medium, wherein the program is running on the computer or loaded into the memory of the computer. A signal wave or a digital signal wave, carrying information which represents the program is provided. A data stream which is representative of the program is provided.

For example the aforementioned program, which for example comprises code means which are adapted to perform any or all of the steps of the method according to the first aspect. A computer program stored on a disc is a data file, and when the file is read out and transmitted it becomes a data stream for example in the form of a (physical, for example electrical, for example technically generated) signal. The signal can be implemented as the signal wave which is described herein. For example, the signal, for example the signal wave is constituted to be transmitted via a computer network, for example LAN, WLAN, WAN, for example the internet. The invention according to the second aspect therefore may alternatively or additionally relate to a data stream representative of the aforementioned program.

In another aspect, the invention is directed to a non-transitory computer-readable program storage medium on which the program, as described herein, is stored.

BRIEF DESCRIPTION OF THE DRAWINGS

In the following, the invention is described with reference to the appended figures which give background explanations and represent specific embodiments of the invention.

The scope of the invention is however not limited to the specific features disclosed in the context of the figures, wherein FIG. 1 schematically shows a flow diagram of an embodiment of the method of the present invention.

DESCRIPTION OF EMBODIMENTS

Figure 1:
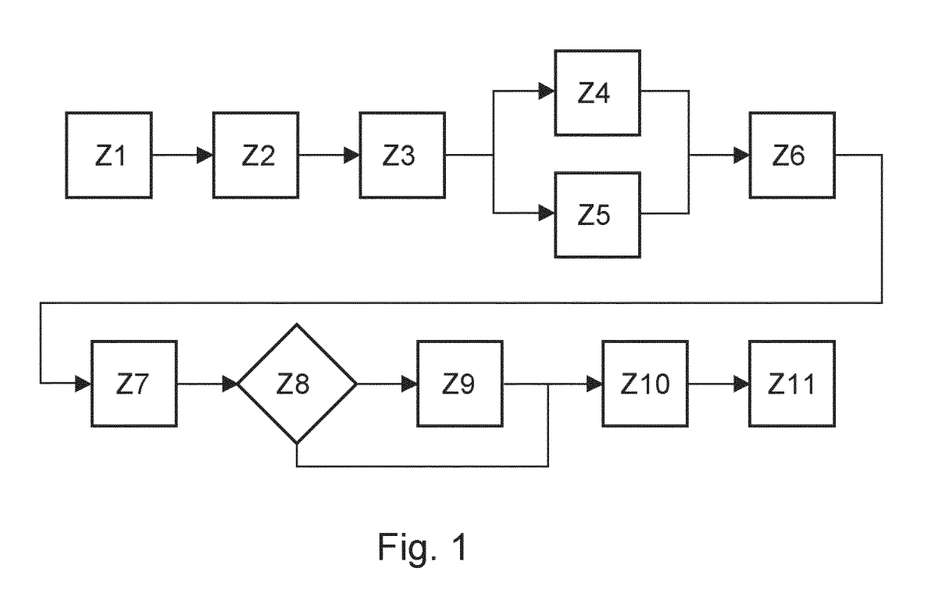

FIG. 1 schematically shows a flow diagram of an embodiment of the method of sampling relevant surface points of a subject 20 for a medical navigation system. In step Z1, a surface registration type R for an intended procedure P on the subject is determined based on the intended procedure P. For example, the intended procedure P is a neurosurgery. Thus, the surface registration type R is determined to be a facial registration.

In step Z2, a user, in particular a medical expert, aims a registration device 10 for registering the subject 20 at the subject 20. The subject 20 in this case is the autonomy of a patient. At start, a contact free point acquisition process is performed for determining a position of at plurality of surface points 21, 22 of the subject 20. For example, the determination of surface points 21, 22 is executed by a continuous measurement, preferably a long as a button on the registration device 10 is pressed by the user. The measurement process determines a plurality of frames of the subject 20.

In step Z3, for every determined frame the following measurements are performed. Firstly, a spatial position X and/or orientation O of the registration device 10 relative to the subject 20 is determined. Preferably, the spatial position X and/or the orientation O is determined with five to six degrees of freedom. Secondly, a distance d between the registration device 10 and the measured surface points 21, 22 on the subject 20 is determined. Thirdly, measurable properties of the subject surface, in particular for every measured surface point 21,22, called property measurements are determined. For example, the colour of the subject 20 at a specific surface point 21, 22 is such a property measurement. In this case, the measurable properties are measured by a camera (not shown).

In step Z4, surface points 21, 22, in particular surface coordinates, are calculated by combining the spatial position X and/or the orientation O of the registration device 10 with the distance d of the registration device 10 to the subject 20.

In step Z5, a tissue type T of the subject surface is determined for each of the measured surface points 21, 22 based on the determined property measurements. For example, if a measured surface point 21, 22 is associated with the property measurement of the colour green, the identified tissue type T is an operation drape. Such associations are preferably executed based on comparing measured values of property measurements with known already associated stored values of property measurements.

In step Z6, the surface points 21, 22 are linked to the tissue type T determined based on the property measurements associated to the surface points 21, 22.

In step Z7, the surface points 21, 22 are validated. Depending on the intended procedure P, in particular the determined registration type R, non-relevant surface points 22, which are considered non-relevant for the intended procedure P, are discarded and relevant surface points, which are considered relevant for the intended procedure P, are accepted. For example, in case of the intended procedure P is a neurosurgery, the surface registration type R is determined to be a facial registration. Thus, a relevant tissue type is skin. Based on the measured colour of the surface points 21, 22, one of the surface points 21, 22 with the colour of skin is associated with the tissue type skin and thus be determined a relevant surface point 21. Another one of the surface points 21, 22 is associated with the colour brown. Thus, the tissue type T of this surface point is determined hair, which is non-relevant for the intended procedure P. Such a surface point is considered a non-relevant surface point and is discarded.

In step Z8, it is decided, if additional surface points 21, 22 are desired for a better acquisition of the subject 20. If more surface points 21, 22 are desired, the method jumps to step Z9. Otherwise, the method jumps to step Z10.

In step Z9, additional surface points 21, 22 are acquired by means of contact-based points acquisition. In this case, areas of the face of the patient, which are covered by hair, can be circumvented by a contact-based point acquisition and thus directly be determined. The measurement of the surface points 21, 22 is triggered manually, for example by pressing a button on the registration device 10 and/or automatically triggered by tissue contact.

In step Z10, surface matching registration is performed, registering the subject 20 to the medical navigation device. The medical navigation device has stored an image dataset 40 of the subject 20, being a virtual representation of the subject 20. This image dataset 40 is matched to the measured relevant surface points 21. Thus, the registration device 10, which is tracked by the tracking device 11a, 11b is matched to a virtual representation 30 of the registration device.

In step Z11, the surface matching registration is verified. The position of the registration device 10 compared with a position of the virtual representation 30 of the registration device in view of the image dataset 40. For example, a tip 12 of the registration device 10 is held against the tip of the nose of the subject 20. Ideally, the virtual representation 30 of the registration device is in contact with the tip of the nose in the image dataset 40. The user can then decide, if the matching procedure is accurate enough for the intended procedure P.

Figure 2:
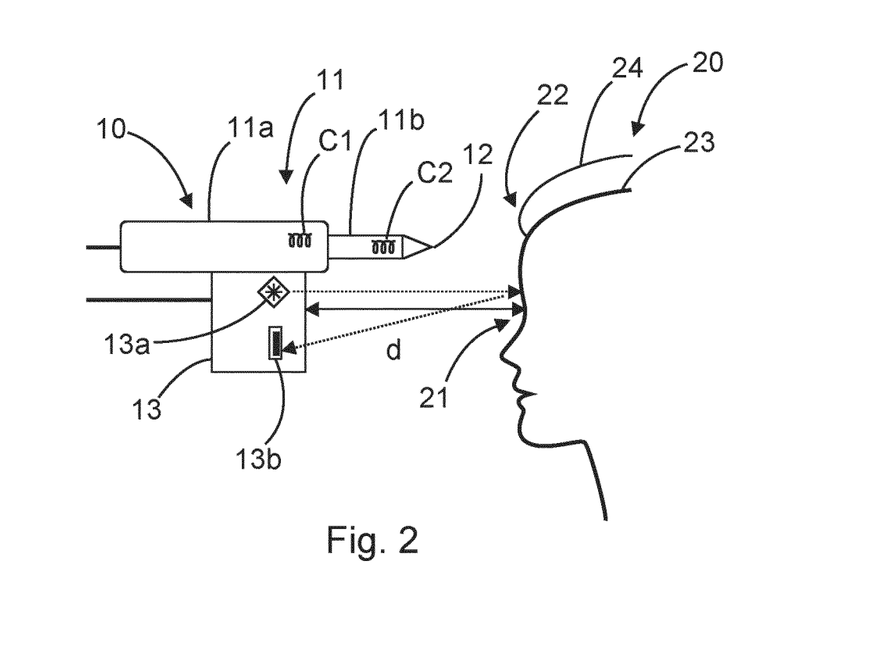
FIG. 2 schematically shows a registration device disposed in front of a subject.

FIG. 2 schematically shows a registration device 10 disposed in front of a subject 20 The subject 20 is the head 23 of a patient with hair 24. The head 23 of the subject 20 should be sampled for a medical navigation system.

Therefore, a registration device 10 is used. The registration device 10 comprises a tracking device 11, a proximity sensor 13, a control device (not shown) and a tissue type identification unit (not shown).

The tracking device 11 comprises a contact-free tracking device 11a, which in this case is an electromagnetic tracking device with at least one coil C1, and a contact-based tracking device 11b, which in this case is a pen formed pointer with at least one coil C2. The coils C1, C2 allow a five point of freedom tracking, in other words the determination of a spatial position X and/or orientation O of the registration device 10. The contact-based tracking device 11b comprises a tip 12.

The proximity sensor 13 comprises a Laser 13a and a CCD-sensor 13b, configured for determining a distance d between the registration device 10 and different surface points 21, 22 of the subject 20.

As can be seen, the surface points relating to the hair 24 can be considered non-relevant surface points 22 and should not be considered during sampling of the relevant surface of the subject 20. On the other hand surface points relating to the head 23 should be considered relevant surface points 21 and should be considered during sampling of the relevant surface of the subject 20.

Figure 3:
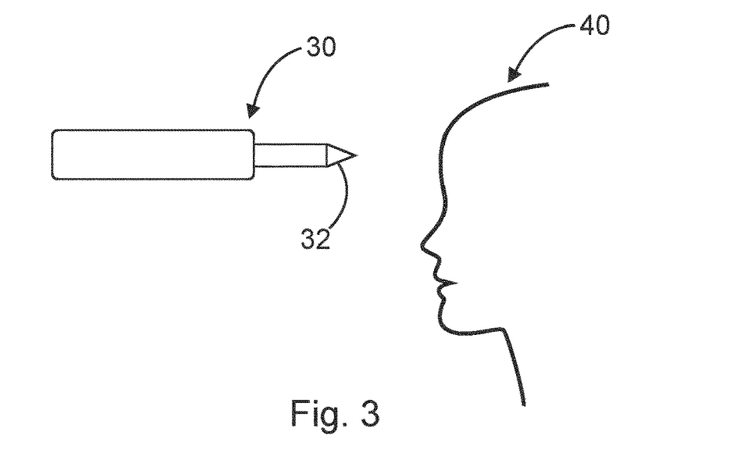
FIG. 3 schematically shows a virtual representation of the registration device disposed in front of an image dataset of a subject.

FIG. 3 schematically shows a virtual representation 30 of the registration device 10 disposed in front of an image dataset 40 of a subject 20. This representation is in accordance with data stored in a medical navigation system. Compared to real subject 20 with a head 23 and hair 24, the image dataset 40 of the subject 20 only includes information relevant for the intended procedure P, in this case the head 23. Ideally, the sampling of the subject 20 only includes relevant surface points 21 of the subject 20. Thus, the accuracy of a surface matching registration can be improved.

For verification of the surface matching registration, a position of a tip 32 of the representation 30 of the registration device 10 compared to the position of the stored image dataset 40 should be in accordance with the position of the tip 12 of the registration device 10 compared to the position of the subject 20.

Figure 4:
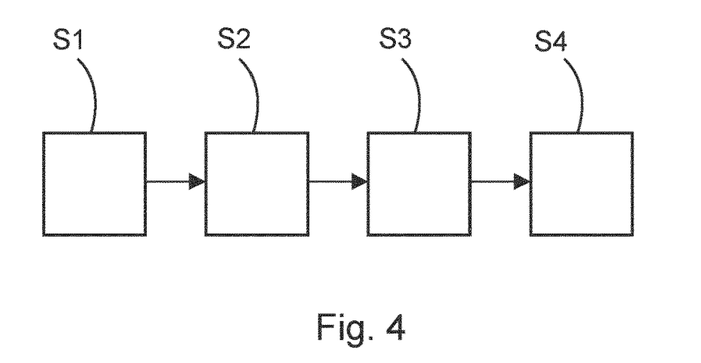
FIG. 4 schematically shows a flow diagram of an embodiment of the method of the present invention.

FIG. 4 schematically shows a flow diagram of method of sampling relevant surface points of a subject 20 for a medical navigation system. The method comprises a step S1 for determining a surface registration type for an intended procedure on the subject dependent on the intended procedure, wherein the surface registration type comprises at least one relevant tissue type of at least part of the subject. In step S2, at least one surface point 21, 22 of the subject 20 is determined using a registration device 10. Following, in step S3 a tissue type of the subject 20 is identified at the determined at least one surface point 21, 22. In step S4, the at least one surface point 21, 22 dependent on the identified tissue type and the determined surface registration type of the intended procedure is validated, thereby determining a position of at least one relevant surface point 21 and/or at least one non-relevant surface point 22, wherein the at least one relevant surface point 21 is accepted and the at least one non-relevant surface point 22 is discarded.

Figure 5:
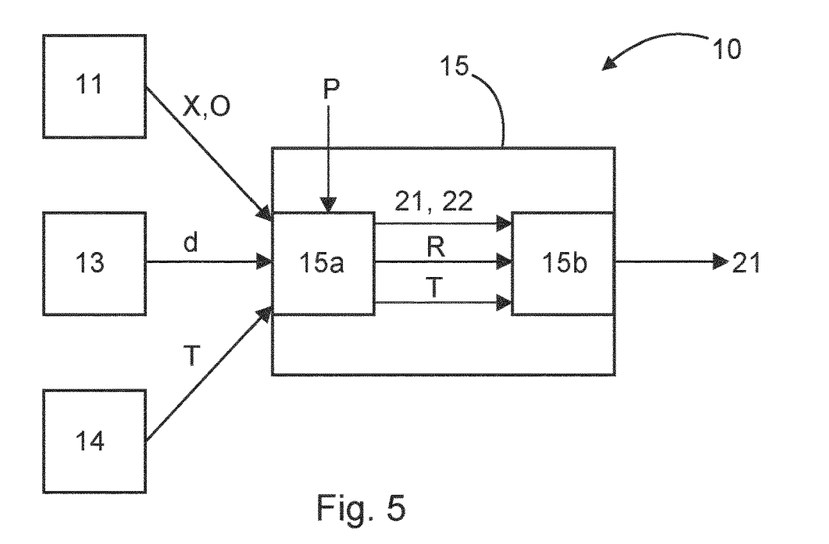
FIG. 5 schematically shows a registration device.

FIG. 5 schematically shows a registration device 10. The registration device 10 for registering a subject 20 for a medical navigation system, comprises a tracking device 11, a proximity sensor 13, a tissue type identification unit 14 and a control device 15.

The tracking device 11 is configured for determining a spatial position X and/or an orientation O of the registration device relative to the subject 20 and is configured for providing the spatial position X and/or the orientation O to the control device 15. The proximity sensor 13 is configured for determining a distanced between the registration device 10 and at least one surface point 21, 22 of the subject 20 and is configured for providing the distanced to the control device 15. The tissue type identification unit 14 is configured for identifying a tissue type T of the subject 20 at least one surface point 21, 22 and is configured for providing the tissue type T to the control device 15. Additionally, the control device 15 is provided with an intended procedure P, in other words, which intervention is planned to be performed on the subject 20 and for which a medical navigation is needed.

The control device 15 is configured for determining a position of at least one surface point 21, 22 of the subject 20 dependent on the determined spatial position X and/or orientation O and/or distance d, determining a surface registration type R for the intended procedure P on the subject 20 dependent on the intended procedure P, wherein the surface registration type R comprises at least one relevant tissue type of at least part of the subject 20, and validating the at least one surface point 21, 22 dependent on the identified tissue type T and the determined surface registration type R of the intended procedure P, thereby determining a position of at least one relevant surface point 21 and/or at least one non-relevant surface point 22, wherein the at least one relevant surface point 21 is accepted and the at least one non-relevant surface point 22 is discarded.

The control device 15 preferably comprises a determination unit 15a and a decision unit 15b. The determination unit 15a is configured for determining the at least one surface point 21, 22 of the subject 20 dependent on the determined spatial position X and/or orientation O and/or distance d, determining a surface registration type R for the intended procedure P on the subject 20 dependent on the intended procedure P. Thus, the determination unit 15a provides the tissue type T, the at least one surface points 21, 22 and the registration type R to the decision unit 15b. The decision unit 15b is configured for validating the at least one surface point 21, 22 dependent on the identified tissue type T and the determined surface registration type R of the intended procedure P, thereby determining a position of at least one relevant surface point 21 and/or at least one non-relevant surface point 22, wherein the at least one relevant surface point 21 is accepted and the at least one non-relevant surface point 22 is discarded.

The invention claimed is:

1. A computer-implemented method executed on at least one processor of at least one computer for sampling relevant surface points of a subject for a medical navigation system, the method comprising:
   determining, by the at least one processor, a surface registration type for an intended procedure on the subject dependent on the intended procedure, wherein the surface registration type comprises at least one relevant tissue type of at least part of the subject;

determining, by the at least one processor and based on data obtained from a plurality of tracking devices, a position of at least one surface point of the subject using a registration device, the determining the position of the at least one surface point of the subject comprises:
  switching between determining, by a contact-based tracking device, the position of the at least one surface point and determining, by a contact-free tracking device, the position of the at least one surface point, wherein the switching is dependent on a determined distance between the registration device and the at least one surface point of the subject;
identifying, by the at least one processor, a tissue type of the subject at the determined at least one surface point; and
automatically validating, by the at least one processor, the at least one surface point dependent on the identified tissue type and the determined surface registration type of the intended procedure, thereby determining a position of at least one relevant surface point and/or at least one non-relevant surface point, wherein the at least one relevant surface point is accepted and the at least one non-relevant surface point is discarded.

2. The method of claim 1, wherein the identifying the tissue type of the subject comprises:
  determining, by the at least one processor, property measurements of the subject; and
  comparing, by the at least one processor, a determined property measurement of the subject with predetermined property values linked to different tissue types.

3. The method of claim 2, wherein the determined property measurements comprise one or more of: an attenuation of radiation, a colour, a spectral absorption, a Raman spectroscopy, and/or a fluorescence.

4. The method of claim 1, wherein the determining the position of the at least one surface point of the subject and the identifying the tissue type of the subject at the determined at least one surface point are executed simultaneously for each surface point.

5. The method of claim 1, wherein the determining the position of the at least one surface point of the subject comprises:
  determining, by the plurality of tracking devices, a spatial position and/or an orientation of the registration device relative to the subject; and
  determining, by the at least one processor, the distance between the registration device and the at least one surface point of the subject.

6. The method of claim 1, further comprising:
  automatically verifying, by the at least one processor, a surface matching registration by comparing a real position of the registration device in view of the subject with a virtual position of a virtual representation of the registration device in view of an image dataset of the subject.

7. The method of claim 1, further comprising:
  executing, by the at least one processor, a surface matching registration, which comprises registering the subject to the medical navigation system, dependent on the accepted at least one relevant surface point.

8. A registration device for registering a subject for a medical navigation system, the registration device comprising:
  a control device; and
  a tissue type identification unit, the tissue type identification unit in operative communication with the control device and configured for:
    identifying a tissue type of the subject at at least one surface point; and
    providing the identified tissue type to the control device; and
  wherein the control device is configured for:
    determining, based on data obtained from a plurality of tracking devices in operative communication with the control device, a position of the at least one surface point of the subject, the determining the position of the at least one surface point of the subject comprises:
      switching between determining, by a contact-based tracking device, the position of the at least one surface point and determining, by a contact-free tracking device, the position of the at least one surface point, wherein the switching is dependent on a determined distance between the registration device and the at least one surface point of the subject;
    determining a surface registration type for an intended procedure on the subject dependent on the intended procedure, wherein the surface registration type comprises at least one relevant tissue type of at least part of the subject; and
    automatically validating the at least one surface point dependent on the identified tissue type and the determined surface registration type of the intended procedure, thereby determining a position of at least one relevant surface point and/or at least one non-relevant surface point, wherein the at least one relevant surface point is accepted and the at least one non-relevant surface point is discarded.

9. The registration device of claim 8, further comprising:
  the plurality of tracking devices in operative communication with the control device and comprising the contact-based tracking device and the contact-free tracking device, the plurality of tracking devices configured for:
    determining a spatial position and/or an orientation of the registration device relative to the subject; and
    providing the determined spatial position and/or the determined orientation to the control device; and
  a proximity sensor in operative communication with the control device, the proximity sensor configured for:
    determining the distance between the registration device and the at least one surface point of the subject; and
    providing the determined distance to the control device,
  wherein the control device is configured for determining the position of the at least one surface point of the subject dependent on one or more of: the determined spatial position, the determined orientation, and/or the determined distance.

10. The registration device of claim 9, wherein the tracking device comprises the contact-free tracking device configured for determining the position of the at least one surface point of the subject.

11. The registration device of claim 10, wherein the contact-free tracking device comprises an optical tracking device configured for determining the position of the at least one surface point of the subject.

12. The registration device of claim 11, wherein the optical tracking device comprises at least one optical marker configured for determining at least one of the spatial position or the orientation of the registration device relative to the subject with at least 5 degrees of freedom.

13. The registration device of claim 10, wherein the tracking device comprises an electromagnetic tracking device configured for determining the position of the at least one surface point of the subject.

14. The registration device of claim 13, wherein the electromagnetic tracking device comprises at least one electromagnetic sensor configured for determining at least one of the spatial position or the orientation of the registration device relative to the subject with at least 5 degrees of freedom.

15. The registration device of claim 10, wherein the tracking device comprises a magnetic tracking device configured for determining the position of the at least one surface point of the subject.

16. The registration device of claim 15, wherein the magnet tracking device comprises at least one magnetic sensor configured for determining at least one of the spatial position or the orientation of the registration device relative to the subject with at least 5 degrees of freedom.

17. The registration device of claim 10, wherein the tracking device comprises a video-based tracking device configured for determining the position of the at least one surface point of the subject.

18. The registration device of claim 17, wherein the video-based tracking device comprises at least one video marker configured for determining at least one of the spatial position or the orientation of the registration device relative to the subject with at least 5 degrees of freedom.

19. The registration device of claim 9, wherein the tracking device comprises the contact-based tracking device configured for determining the position of the at least one surface point of the subject.

20. The registration device of claim 8, wherein the control device is configured for:
    automatically verifying a surface matching registration by comparing a real position of the registration device in view of the subject with a virtual position of a virtual representation of the registration device in view of an image dataset of the subject.

21. The registration device of claim 8, wherein the control device is configured for executing a surface matching registration, which comprises registering the subject to the medical navigation system, dependent on the accepted at least one relevant surface point.

22. A surgical navigation system for computer assisted surgery, the system comprising the registration device according to claim 19.

23. A non-transitory computer readable storage medium storing a computer program comprising program instructions that, when executed on at least one processor of a computer or loaded onto the at least one processor of the computer, causes the computer to perform a method of sampling relevant surface points of a subject for a medical navigation system by:
    determining a surface registration type for an intended procedure on the subject dependent on the intended procedure, wherein the surface registration type comprises at least one relevant tissue type of at least part of the subject;
    determining, based on data obtained from a plurality of tracking devices, a position of at least one surface point of the subject using a registration device, the determining the position of the at least one surface point of the subject comprises:
        switching between determining, by a contact-based tracking device, the position of the at least one surface point and determining, by a contact-free tracking device, the position of the at least one surface point, wherein the switching is dependent on a determined distance between the registration device and the at least one surface point of the subject;
    identifying a tissue type of the subject at the determined at least one surface point; and
    automatically validating the at least one surface point dependent on the identified tissue type and the determined surface registration type of the intended procedure, thereby determining a position of at least one relevant surface point and/or at least one non-relevant surface point, wherein the at least one relevant surface point is accepted and the at least one non-relevant surface point is discarded.

* * * * *